Dec. 17, 1968   H. B. HELLER ETAL   3,417,361
SEMICONDUCTIVE PRESSURE TRANSDUCER
Filed March 7, 1966
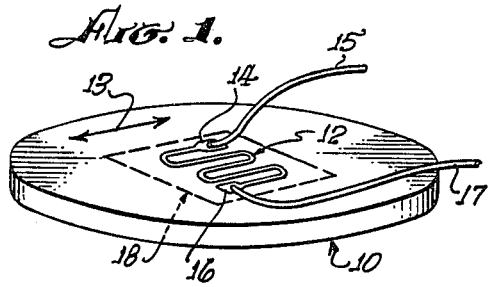
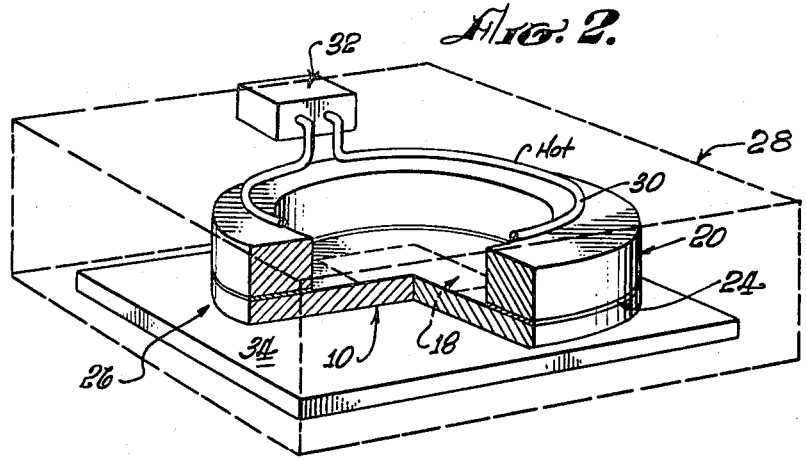
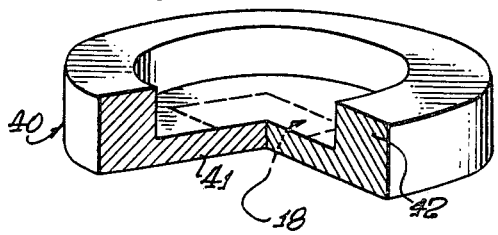
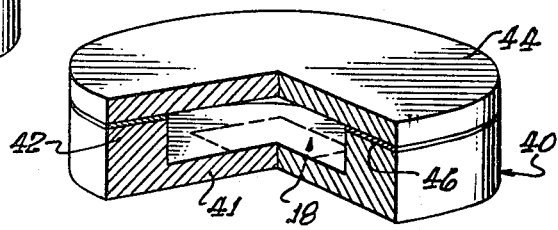
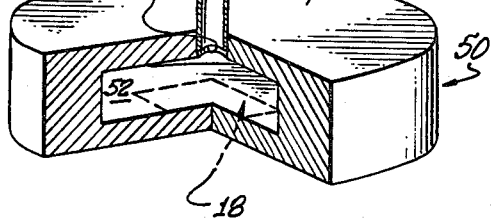
INVENTORS.
HENRY B. HELLER,
ROBERT C. ABRAHAM,
BY Charlton M. Lewis United States Patent Office 3,417,361
Patented Dec. 17, 1968

3,417,361
SEMICONDUCTIVE PRESSURE TRANSDUCER
Henry Bernhard Heller, Pasadena, and Robert C. Abraham, Monrovia, Calif., assignors to Conrac Corporation, a corporation of New York
Filed Mar. 7, 1966, Ser. No. 532,290
12 Claims. (Cl. 338—42)

ABSTRACT OF THE DISCLOSURE

A semiconductive anchoring formation is grown as a single crystal to a peripheral region of a stress-sensitive element. The grown support formation typically holds the periphery of the element essentially rigidly, isolating it from spurious forces. Direct crystal growth of the support formation to the sensing element avoids the mechanical damage and the dimensional limitations associated with machining a comparable structure from a conventional single crystal.

The directly grown single-crystal support formation may form with the sensing element a fluid-tight enclosure responsive to pressure differentials between the interior and exterior. Such an enclosure may be formed directly with its interior evacuated.

---

This invention has to do with pressure transducers utilizing the known properties of semiconductors whereby certain electrical characteristics vary with imposed stress.

The present invention relates more particularly to solid state pressure transducers comprising a fluid-tight enclosure having a wall portion that is stressed in response to pressure differential between the interior and exterior of the enclosure. The resulting variation in a selected electrical characteristic of that wall portion may be detected in conventional manner.

Previously available pressure transducers of that type have been subject to serious limitations of sensitivity, range and reliability. Those limitations were due in large part to the differences in thermal coefficient of expansion between the semi-conductive stress-sensitive element and the adjoining portion of the apparatus to which it was rigidly bonded or otherwise mechanically coupled.

It has previously been proposed to construct an entire stress-supporting member, such as a beam or diaphragm, of mechanically homogeneous semiconductive material. The resistance change of the entire body of such an element may be sensed, as described, for example, in United States Patent 3,079,576 issued on February 26, 1963, to R. R. Kooiman. Or the resistance change of a thin surface layer of such an element may be sensed, as described, for example, in United States Patent 3,049,685, issued on August 14, 1962, to William V. Wright, Jr. However, it is still necessary to mount the stressed element in a supporting structure through which the stress is applied to it. And in the case of a pressure transducer it is necessary to provide a fluid-tight joint between the stressed element and the support structure to enable the fluid pressure to exert a force differentially on opposite surface portions of the element.

Such joints have sometimes utilized adhesives such as resins for bonding the sensing element to the support structure. However, it has not been possible to avoid aging effects and hysteresis in the output of the transducer. Clamping of the parts subjects the sensing element to stresses that vary with temperature and produce spurious signal components that are difficult or impossible to compensate satisfactorily. And the use of soft seals such as O-rings cannot provide the hermetic seal that is sometimes required between the two faces of the sensing element. It may be noted for completeness that pressure transducers in which the stress sensor is subjected only to uniform hydrostatic compression on all surfaces may be designed without any fluid-tight joint between the sensor and another element. However, that type of transducer involves other difficulties the details of which are not pertinent to the present invention.

Transducers in accordance with the present invention are typically entirely free of hysteresis and aging effects of the types described above. That is accomplished by forming a pressure enclosure essentially as a unitary structure of mechanically homogeneous semiconductive material. The thermal expansion characteristics of the enclosure are then uniform throughout that structure, and the stress-sensitive region of the enclosure wall is not subjected to mechanical stresses due to temperature variations of the entire structure.

In a preferred form of the invention, the chamber enclosed by the described unitary enclosure is evacuated during construction of the device. The internal pressure is then effectively zero, providing a reference value that is maintained permanently and independently of temperature variations. The pressure to be measured is then applied to the exterior of the enclosure, as by mounting the entire enclosure within a pressure vessel. Such mounting may be designed in conventional manner to avoid exerting any significant local forces upon the enclosure; and what forces are so exerted may readily be limited to the portions of the enclosure remote from the stress-sensitive portion.

In an illustrative procedure for fabricating a transducer of the described type, the stress-sensitive element proper is first constructed, typically in conventional fashion, with electrical terminals for obtaining a signal in response to stressing of the element. That element is typically essentially a single crystal in the form of a flat circular diaphragm having a diffused surface layer which is directly contacted by the terminals but is isolated from the body of the diaphragm by a rectifying junction. After completion and testing of the sensor proper, the structural portions of the pressure enclosure are assembled to it, either in one operation or by a series of successive assembly operations. One or more structural members are separately fabricated of semiconductor material having closely similar physical properties to the material of the sensor proper and typically essentially identical with the latter. The members to be joined are assembled in the desired relationship but separated by a thin layer of a suitable metal, typically an aluminum or silver foil, for example, in which the semiconductor material is soluble at an elevated temperature above a critical value but lower than its own melting temperature. The assembly is then heated in such a way that at least the region adjacent the metallic layer is above the critical temperature, producing a liquid solution of metal and semiconductor, and a thermal gradient is maintained across that solution layer. The direction of that gradient is preferably such that the sensor proper is cooler than the member to which it is being joined. The thermal gradient then causes the thin layer of solution to migrate away from the sensor into the adjoining member, semiconductive material dissolving from that member in the solution and crystallizing out on the sensor. That migration is continued typically until the metal layer emerges at a surface of the structural member. The metal may then be etched from that surface, or may be employed for joining another structural member at that surface.

An advantage of that technique for the present purpose is that the semiconductor laid down in the wake of the migrating solution layer is typically crystalline with the same crystal orientation as the adjoining sensor proper and forming an integral continuation of the original single crystal of the sensor. The homogeneity of the resulting unitary structure thus typically extends to crystal orientation as well as substantial uniformity of composition.

The general concept of that method of assembling pieces of semiconductive material has been described by W. G. Pfann in Journal of Metals, vol. 7, pages 961–4, September 1955. He refers to the procedure as temperature gradient zone melting, and suggests its use for assembling semiconductive devices such as diodes and transistors. The present invention adapts temperature gradient zone melting to the construction of a unitary pressure chamber having a stress sensor integrally incorporated in it.

A full understanding of the invention and of its further objects and advantages will be had from the following description of certain illustrative manners in which it may be carried out. The particulars of that description, and of the drawings which form a part of it, are intended only as illustration and not as a limitation upon the scope of the invention, which is defined in the appended claims.

In the drawings:

FIG. 1 is a schematic perspective representing an illustrative pressure responsive diaphragm with stress responsive sensor structure;

FIG. 2 is a schematic perspective partially broken away representing an assembly process in accordance with the invention;

FIG. 3 is a similar schematic perspective representing a product of the process of FIG. 2;

FIG. 4 is a fragmentary diagram similar to FIG. 2 representing a further assembly process;

FIG. 5 is a schematic perspective illustrating a semiconductive pressure transducer in accordance with the invention.

FIG. 1 represents schematically a pressure responsive element in which the selected electrical characteristic for sensing pressure is the piezoresistance. The disk 10 of semiconductive material is suitably doped to produce a selected conductivity type. Disk 10 is preferably a single crystal, with crystal axes oriented in such a way that the longitudinal piezoresistance coefficient of the material is a maximum in a particular direction 13 parallel to the plane of the disk. The thickness of disk 10 is small compared to its diameter, typically of the order of one tenth or less, forming a diaphragm responsive to pressure differences on its opposite faces. A selected area or pattern 12 of one face of disk 10 is treated in known manner to produce a thin surface layer of opposite conductivity type, separated from the body of the disk by a rectifying junction. Pattern 12 typically includes two terminal areas 14 and 16 connected by a relatively long and thin strip extending back and forth predominantly parallel to the direction 13. Electrical conductors 15 and 17 are attached to the respective terminal areas of the pattern in known manner to produce ohmic electrical junctions. A uniform current can then be caused to flow through those conductors and through the pattern surface layer 12, which is effectively isolated electrically from the body of the disk by the rectifying junction. The potential difference between the conductors accompanying such current flow provides a measure of the resistance variations of pattern 12 and hence of the instantaneous stress of disk 10. Pattern 12 and the cooperating conductors 15 and 17 thus form a stress responsive configuration or strain gage, indicated generally by the numeral 18. The specific strain gage 18 of FIG. 1 is merely illustrative of the wide variety of known forms that may be used, some of which include a plurality of distinct and differently oriented resistance elements with more than two conductors. Such configurations may include elements on both disk faces and may comprise an entire Wheatstone bridge. In other known strain gage structures the conductors are connected at spaced surface points of element 10 without any distinct surface layer 12, so that the sensed resistance changes are within the main body of element 10. When disk 10 is subjected to differential pressure on its opposite faces the material at one face is subjected to compression, that at the other face to tension, producing a measurable piezoresistive effect between terminals 14 and 16 or their equivalent. The diaphragm structure with an integrally formed piezoresistive sensor, shown illustratively at 18 in FIG. 1 is well known in and of itself.

In accordance with the present invention, a pressure responsive configuration such as that of FIG. 1 is combined with initial supporting structure in a manner illustrated schematically in FIG. 2. In that figure the disk 10 is typically similar to that shown in FIG. 1, with integral piezoresistive sensor 18. That sensor may comprise structure in either or both of the disk faces or within the main body of the disk. A support element 20, shown as a relatively stable ring of rectangular section, is assembled in face to face relation to disk 10, but separated therefrom by a thin sheet of metal indicated schematically at 24. Metal sheet 24 is typically only a few mils thick, but its thickness is exaggerated in the present drawings for clarity of illustration. The three elements 10, 20 and 24 form an assembly 26 which may be held together temporarily in any suitable manner, as by a light clamp structure, not explicitly shown, which preferably extends peripherally of the ring in a uniform manner.

Ring 20 consists essentially of the same semiconductor as disk 10, and is preferably a single crystal with axes so oriented that when assembled as in FIG. 2 they are parallel to the crystal axes of disk 10. However, many aspects of the invention may be accomplished with full effectiveness with different crystal orientations of elements 10 and 20, and structural element 20 then need not be a single crystal.

Metal layer 24 consists essentially of a metal or alloy that forms with the semiconductor of elements 10 and 20 a liquid solution at an elevated temperature that is less than the melting temperature of the semiconductor. The metal and semiconductor are so selected that the solubility of the semiconductor in the solution is reasonably high, for example of the order of 10 to 50 percent, and preferably increases rapidly with temperature within at least the lower portion of the temperature range above the formation temperature for the solution and below the melting temperature for the semiconductor.

Assembly 26 is placed in an inert atmosphere or in vacuum and is subjected to controlled heat, as in the furnace represented schematically at 28. Heat is applied in such a way as to produce a temperature gradient essentially normal to the plane of disk 10. For example, heat may be applied to the upper face of ring 20, as seen in FIG. 2, and removed from the lower face of disk 10. Such heat supply is typically by radiation from an electrically heated element 30 of tungsten or other suitable material that is mounted just above the ring surface in any suitable manner, as by insulated supports not explicitly shown. For that purpose electrical power may be supplied to element 30 from a conventional control device indicated schematically at 32, which may include a thermostatic control for regulating the temperature of the wire itself or of any desired portion of assembly 26. Removal of heat from the lower face of disk 10 may be similarly accomplished by radiation or conduction from that surface to a heat sink indicated schematically at 34. Heat sink 34 may directly support assembly 26, or spacing elements of small cross-section, typically of insulating material, may be interposed. Means are preferably provided for controlling the temperature of surface 34 independently of heat source 30. Surface 34 may, if desired, be the floor of a suitably constructed regulated furnace, and heat source 30 may compromise the interior roof of the furnace, which is maintained at a higher temperature than the floor.

As the temperature of assembly 26 adjacent metal layer 24 reaches the lowest melting temperature of the semiconductor-metal system, the metal layer is converted into a liquid solution which becomes substantially saturated with semiconductor. Due to the temperature gradient, the solubility of semiconductor in the solution is higher at the upper boundary of the solution than at the lower boundary. An essentially equilibrium condition is quickly established whereby semiconductor dissolves into the solution from ring 20, diffuses downward through the solution and precipitates as solid on the upper face of disk 10. The rate of precipitation is readily adjusted to such a value that the semiconductor thus deposited is crystalline and conforms to the crystal orientation established by disk 10, which thus acts as a seed crystal. A small proportion of the metal of layer 24 is deposited with the crystallizing semiconductor, corresponding generally to the solubility of the metal in the solid semiconductor at the temperature at which crystallization takes place. That solubility is typically low enough to have negligible effect on the physical characteristics of the resulting crystal, but may control its conductivity type and resistance. In general, a metal is preferably selected for layer 24 which will cause the semiconductor deposited on disk 10 to be of the same conductivity type as the body of that disk.

Since the rate of progression of the solution zone normally increases with temperature as well as with the steepness of the temperature gradient, it may be desired to operate with the zone temperature at a value high enough to cause significant diffusion of the doping elements involved in piezoresistive sensor 18. Such diffusion can be substantially prevented by maintaining the central portion of heat sink 34 at a cooler temperature than the portion directly below the periphery of assembly 26. Alternatively, it may be convenient to take account, in the initial formation of sensor 18, of the fact that a definite amount of further diffusion will occur during the integration of the transducer enclosure. In actual practice, satisfactory rates of progression of the solution zone, such as 0.01 to 0.05 inch per hour, for example, are ordinarily obtainable with operating temperatures low enough to cause little or no diffusion in the sensor configuration.

The described progressive solution and recrystallization of element 20 is typically continued, with progressive upward migration of the thin layer of metal-semiconductor solution, until the latter layer appears at the upper surface of element 20. The system may then be gradually cooled, while maintaining the described thermal gradient. The resulting recrystallized material of element 20 is then substantially homogeneous throughout its vertical dimension, with a substantially homogeneous layer of metal at its upper surface containing a relatively small concentration of semiconductor. The metal of the latter layer can readily be removed if desired, as by a chemical etch.

The resulting unitary single crystal is shown in FIG. 3, with relatively thin diaphragm region 41, heavy supporting flange 42 and piezoresistive sensor 18 integrated with the diaphragm portion in the manner already described. Production of such a structure in the described manner has the great advantage over previous methods that strains resulting from conventional machining techniques are completely avoided. The diaphragm proper can be cut from a grown single crystal in conventional manner by a simple sawing process, and can be annealed, if desired, at high temperature before forming sensor 18. Any strains in ring 20 resulting from machining or other steps in its formation are, of course, completely eliminated during the present integrating technique by its complete solution and recrystallization. And the final product is essentially strain free since flange 42 has been produced on diaphragm 41 by direct single crystal growth at a temperature well below the melting point of the semiconductor itself. By suitable selection of dimensions, flange 42 can be made essentially rigid by comparison to the relatively thin diaphragm portion 41. The flange region can then be clamped firmly in a mounting structure without significantly stressing the diaphragm.

However, for most pressure sensing operations it is preferred to form a complete unitary enclosure of which diaphragm region 41 comprises one wall portion. For that purpose, in accordance with one modification of the invention, a cover plate 44 is assembled on flange region 42, as shown schematically in FIG. 4, with a thin layer of metal between them as indicated at 46. Metal layer 46 may comprise the remains of layer 24 of FIG. 2, remaining on the surface of ring 20 as previously described. Alternatively, if that remaining metal has been etched away, a fresh layer is provided, which is preferably of the same metal and may be substantially identical to the initial layer 24. The assembly of FIG. 4 is then subjected to a thermal gradient at elevated temperature under similar conditions and in a similar manner to those already described in connection with FIG. 2. Metal layer 46 is thereby converted to a semiconductor solution which migrates progressively upward through the thickness of cover 44, as seen in FIG. 4, emerging as an annular surface layer of solid metal at the upper face of the cover. During that process, an annular peripheral portion of cover 44 is dissolved and recrystallized by single crystal growth on the upper face of flange region 42. That recrystallized material becomes a unitary structure with the central portion of cover 44, which typically is not dissolved. Moreover, if cover 44 is initially cut from a single crystal and is cut and assembled in the same crystal orientation as assembly 40, the entire resulting structure is essentially a unitary single crystal, as indicated at 50 in FIG. 5.

If preferred, the unitary structure typified by FIG. 5 can be produced by subjecting the initial sensor carrying member to only a single step of temperature gradient zone melting. For example, annular element 20 and cover 44 may first be joined to form a unitary housing member, or such a member may be initially cut from a single piece of semiconductor. That housing member may then be assembled to disk 10 with an intervening metal layer similar to layer 24 of FIG. 2, and that layer caused to migrate, for example upward to the top outer surface of the housing member. If the housing member is a single crystal oriented like the sensor carrying diaphragm, the resulting structure is typically also a single crystal, as described in connection with FIG. 5.

It is ordinarily preferred to unify the structural members, whatever their detailed form, by causing the intervening solution layer to migrate away from the sensor structure, partly because the latter is then farther from the heated zone. In some instances, however, it may be convenient to cause layer migration toward the sensor carrying member. For example, if in FIG. 2 the positions of heat source and heat sink are interchanged, inverting the temperature gradient, layer 24 will migrate downward through the peripheral region of disk 10, in a manner generally similar to the described upward migration of layer 46 of FIG. 4 through the peripheral portion of cover 44. When that is done it is highly desirable that both members be of single crystal form and be assembled with their crystal axes accurately parallel to insure a single crystal configuration in the neighborhood of the diaphragm portion of the resulting structure. Also, it may be desirable to provide a heat sink adjacent the portion of disk 10 that carries the sensor proper to prevent excessive heating of the latter. Such a heat sink may comprise, for example, a cooled circular plate adjacent the lower surface of disk 10 and spaced within the heat source employed to heat the peripheral region of that disk.

As a further example of layer migration toward the sensor carrying element, cover member 44 of FIG. 4 may be provided with a stress sensing configuration similar to that of diaphragm region 41. After completion of the described migration of solution layer 46 upward through the peripheral region of member 44, the resulting structure of FIG. 5 then comprises two sensor carrying diaphragm portions spaced by a closed chamber and forming an entirely unitary structure that may consist essentially of a single crystal. In such a structure it is ordinarily desirable that both diaphragm portions have the same thickness, and their stress sensors may be connected, if desired, in a common bridge network to produce a single output signal.

It may be noted that for some particular combinations of semiconductor and metal the solution layer will have a semiconductor solubility that decreases with increasing temperature within a definite temperature range. Under that condition the same general procedure is applicable, but the direction of migration of the solution layer is, of course, opposite to the temperature gradient rather than in the same direction as illustratively described above.

Assembly 50 may be provided with a fluid conduit for supplying fluid to the enclosed chamber 52. In FIG. 5 such a conduit is indicated at 54, mounted as by soldering or epoxy cement in a bore in the chamber wall. Such a bore may be provided in the cylindrical wall 42, but is shown illustratively at 47 in the cover portion of the enclosure. Conduit 54 may be of any suitable metal or other material, preferably having a coefficient of thermal expansion not greatly different from that of the semiconductor of assembly 50. However, for a conduit of small diameter and thin wall, especially when mounted symmetrically and remotely from sensor 18, as illustrated, even an appreciable difference of expansion has only a negligible effect upon the sensor. The sensor response then corresponds accurately to the difference between the pressure supplied via conduit 54 to chamber 52 and the ambient pressure surrounding assembly 50. The latter pressure may be that of an enclosure in which the entire assembly is mounted.

Alternatively, bore 47 and conduit 54 may be omitted. The pressure within chamber 52 then serves as a reference pressure for measuring the pressure of the ambient fluid. The invention has the great advantage that a definite amount of gas can be provided within the instrument enclosure during manufacture, and is then reliably maintained since the capsule is typically hermetically sealed by virtue of its unitary structure. In particular, for many purposes the internal reference pressure is preferably essentially zero. That condition is readily obtained by evacuating the furnace or other enclosure in which the final assembly of the capsule by temperature gradient zone melting is achieved, as described in the present embodiment in connection with FIG. 4, for example.

When a variable pressure is to be sensed by supplying a fluid to the interior of enclosure 50, as via conduit 54, it may be advantageous to isolate piezoresistive sensor 18 from that fluid. That may be accomplished by forming sensor 18 on the outer face of diaphragm portion 41. Sensor structure may be formed in that position after partial or complete assembly of the structural members enclosing the pressure chamber, if desired. However, sensor structures of uniform and reliable sensitivity can usually be produced more conveniently upon a member having simple geometrical configuration rather than upon a surface of the completed housing.

When the interior of the enclosure contains a permanent reference pressure it is usually preferable to confine the sensor proper to the interior face of the diaphragm wall where it is protected from mechanical damage and isolated from any test fluid that may contact the exterior of the transducer. Electrical conductors such as those represented at 15 and 17 of FIG. 1 may be led through the enclosure wall by means of a small bore such as bore 47 of FIG. 5, which is then filled by a suitable sealing material that also provides electrical insulation for the conductors.

A preferred semiconductive material for carrying out the present invention is silicon, but many other semiconductors may be employed. As already indicated, the metal employed to produce a solution layer for unifying two semiconductor members by temperature gradient zone melting may be essentially any metal that forms with the semiconductor a solution in which the semiconductor solubility is a satisfactorily steep function of temperature throughout a temperature range that is below the melting point of the semiconductor. It is ordinarily preferred to employ a metal that is only sparingly soluble in the solid semiconductor at the low solubility end of the selected temperature range. That is the case, for example, for aluminum and silver in silicon. Other metals forming suitable solutions with silicon are copper, cobalt, titanium and to a lesser extent gold and iron. Beryllium produces with silicon at relatively low temperature a solution in which the silicon solubility varies inversely with temperature, producing layer migration counter to the temperature gradient.

We claim:

1. A pressure transducer comprising in combination
    a unitary body of semiconductive material forming a wall that encloses essentially completely an internal chamber,
    at least a region of the chamber wall having an electrical characteristic that varies in response to variations of differential pressure between the interior and exterior of the chamber,
    and output means responsive to said electrical characteristic variations and including terminals electrically connected to said wall region at mutually spaced points thereof.

2. A pressure transducer as defined in claim 1, and wherein said unitary body is essentially physically homogeneous and includes a portion having essentially the form of a diaphragm, and said wall region is a unitary part of that body portion.

3. A pressure transducer as defined in claim 1, and wherein said region of the wall comprises a thin surface layer separated from the main body of the wall by a semiconductor barrier junction.

4. A pressure transducer as defined in claim 1, and wherein said unitary body consists essentially of crystalline semiconductive material with the crystalline axes oriented essentially uniformly throughout the body.

5. A pressure transducer as defined in claim 1, and wherein said internal chamber is evacuated.

6. A solid state pressure transducer comprising in combination
    a unitary body of silicon consisting essentially of a single crystal and forming a wall that encloses essentially completely an internal chamber,
    the chamber wall including a portion having the form of a diaphragm that is stressed in response to differential pressure between the interior and exterior of the chamber,
    piezoresistive means forming a unitary part of said wall portion and responsive to stressing of the wall portion,
    and output means for producing an electric signal in response to the piezoresistive means.

7. The method of fabricating a transducer, comprising in combination the steps of
    providing first and second unitary bodies, the first body consisting essentially of a single crystal of a semiconductive material and including a diaphragm region having an electrical characteristic responsive to imposed transverse stress, said region being surrounded by a peripheral region having a generally annular flat face, and the second body consisting essentially of said semiconductive material and comprising at least a generally annular portion having a generally annular face that accurately fits against the flat face of the first body,
    assembling the bodies with their said faces in mutually opposed relation with an interposed layer of a metal capable of forming a solution with said semiconductive material at an elevated temperature less than the melting point of said material, regrowing one of the bodies to the other by temperature gradient zone melting to make the two bodies into an essentially strain free unitary structure wherein the first body and at least said generally annular portion of the second body form essentially a single crystal, said annular portion being sufficiently massive to anchor the diaphragm periphery essentially rigidly, providing electrical connections to said diaphragm region for detecting said electrical characteristic thereof, and mounting the unitary structure on mounting structure to form a transducer, with said generally annular portion interposed between the mounting structure and the diaphragm region to effectively isolate the diaphragm region from stress variations due to the mounting structure.

8. The method defined in claim 7, and in which
said second body includes a continuous web portion peripherally integrated with said generally annular portion and recessed from said flat face, so that the assembled bodies completely enclose a chamber,
and said step of temperature gradient zone melting is carried out in vacuum to produce an integrated structure that completely encloses an evacuated internal chamber, said diaphragm region forming a wall of the chamber.

9. The method defined in claim 7, and including also the steps of
providing a third body consisting essentially of said semiconductive material and having a generally flat form with a generally annular flat face that accurately fits the face of said annular portion of the second body that is opposite to the first said face thereof, assembling the third body and said generally annular portion, with their fitting faces in mutually opposed relation, and with an interposed layer of said metal,
and regrowing the third body to said annular portion by temperature gradient zone melting to form a unitary body,
said two steps of temperature gradient zone melting producing a unitary structure that encloses essentially completely an internal chamber, said diaphragm region forming a wall of the chamber.

10. The method defined by claim 9, and in which
at least the last performed step of temperature gradient zone melting is carried out in vacuum, whereby said internal chamber within the resulting unitary structure is evacuated.

11. The method defined in claim 7, and wherein
said semiconductive material is silicon
and said metal layer consists essentially of a metal selected from the group consisting of aluminum, silver, titanium, copper and cobalt.

12. A transducer produced by the method defined in claim 7.

References Cited

UNITED STATES PATENTS 3,079,576   2/1963   Kooiman _____ 338—4

OTHER REFERENCES

Pfann, W. G., Temperature Gradient Zone Melting in Journal of Metals, vol. 7, pp. 961–964, September 1955.

LEWIS H. MYERS, *Primary Examiner.*

D. A. TONE, *Assistant Examiner.*

U.S. Cl. X.R.

338—4; 317—234; 29—576